United States Patent
Yang et al.

(10) Patent No.: US 12,192,494 B2
(45) Date of Patent: *Jan. 7, 2025

(54) CHROMA PREDICTION METHOD AND DEVICE

(71) Applicant: Huawei Technologies Co., Ltd., Guangdong (CN)

(72) Inventors: Haitao Yang, Shenzhen (CN); Hong Zhang, Shenzhen (CN); Shan Liu, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,886

(22) Filed: Jun. 9, 2021

(65) Prior Publication Data

US 2021/0297682 A1    Sep. 23, 2021

Related U.S. Application Data

(63) Continuation of application No. 16/744,987, filed on Jan. 16, 2020, now Pat. No. 11,082,709, which is a
(Continued)

(30) Foreign Application Priority Data

Jul. 17, 2017    (CN) .......................... 201710582094.1

(51) Int. Cl.
*H04N 19/30* (2014.01)
*H04N 19/117* (2014.01)
(Continued)

(52) U.S. Cl.
CPC ........... *H04N 19/30* (2014.11); *H04N 19/117* (2014.11); *H04N 19/176* (2014.11); *H04N 19/186* (2014.11)

(58) Field of Classification Search
None
See application file for complete search history.

(56) References Cited

U.S. PATENT DOCUMENTS

2011/0002391 A1    1/2011    Uslubas et al.
2011/0002554 A1    1/2011    Uslubas et al.
(Continued)

FOREIGN PATENT DOCUMENTS

CN    101159874 A    4/2008
CN    101394565 A    3/2009
(Continued)

OTHER PUBLICATIONS

Davies et al., "Adaptive Resolution Coding (ARC)", 98. MPEG Meeting; Nov. 28, 2011-Dec. 2, 2011; Geneva; (Motoin Picture Expert Group or ISO/IEC JTC 1/SC29/WG11), No. m21824, Nov. 25, 2011. (Year: 2011).*

(Continued)

*Primary Examiner* — James M Anderson, II
(74) *Attorney, Agent, or Firm* — WOMBLE BOND DICKINSON (US) LLP

(57) ABSTRACT

A prediction method includes: performing downsampling on a luma component of a to-be-processed image block to obtain an initial signal of the luma component; obtaining a residual signal of the luma component based on the obtained initial signal of the luma component; obtaining a residual signal of a chroma component of the to-be-processed image block based on the chroma component of the to-be-processed image block without downsampling. The method further includes: respectively performing a transform on the residual signal of the luma component and the residual signal of the chroma component, to obtain transform coefficients, performing quantization on the obtained transform coefficients, to obtain quantization coefficients, and perform- (Continued)

⨂ = Location of a luma sampling point
◯ = Location of a chroma sampling point ing entropy encoding on the obtained quantization coefficients to obtain a bitstream.

21 Claims, 9 Drawing Sheets

Related U.S. Application Data continuation of application No. PCT/CN2018/087836, filed on May 22, 2018.

(51) Int. Cl.
*H04N 19/176* (2014.01)
*H04N 19/186* (2014.01)

(56) References Cited

U.S. PATENT DOCUMENTS

| | | | |
|---|---|---|---|
| 2012/0287995 A1 | 11/2012 | Budagavi | |
| 2012/0328013 A1 | 12/2012 | Budagavi et al. | |
| 2013/0188686 A1* | 7/2013 | Tourapis | H04N 19/59 375/240.02 |
| 2014/0086502 A1 | 3/2014 | Guo et al. | |
| 2014/0140401 A1 | 5/2014 | Lee et al. | |
| 2014/0341282 A1 | 11/2014 | Yang et al. | |
| 2015/0124875 A1 | 5/2015 | Xu et al. | |
| 2016/0080773 A1* | 3/2016 | Nakamura | H04N 19/176 375/240.12 |
| 2016/0241861 A1 | 8/2016 | Choe et al. | |
| 2016/0277762 A1* | 9/2016 | Zhang | H04N 19/593 |

FOREIGN PATENT DOCUMENTS

| | | | | |
|---|---|---|---|---|
| CN | 103220508 A | 7/2013 | | |
| CN | 103688533 A | 3/2014 | | |
| CN | 104322068 A | 1/2015 | | |
| IN | 101742301 B | 4/2017 | | |
| JP | 2013034162 A | 2/2013 | | |
| JP | 2014525176 A | 9/2014 | | |
| JP | 2017512439 A | 5/2017 | | |
| WO | 2006026903 A1 | 3/2006 | | |
| WO | WO-2012175646 A1 * | 12/2012 | | H04N 19/105 |
| WO | 2013160695 A1 | 10/2013 | | |

OTHER PUBLICATIONS

ITU-T H.264(Apr. 2017) Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

ITU-T H.265(Dec. 2016), Series H: Audiovisual and Multimedia Systems, Infrastructure of audiovisual services—Coding of moving video, High efficiency video coding, Dec. 2016. total 664 pages.

"Algorithm description of Joint Exploration Test Model 5 (JEM5)", Motion Picture Expert Group or ISO/IEC JTC1/SC29/WG11 ), No. N16698, Feb. 13, 2017(Feb. 13, 2017), XP030023366, total 44 pages.

Davies (Cisco) T et al: "AHG18: Adaptive Resolution Coding (ARC)", (Motion Picture Expert Group or ISO/IEC JTC1/SC29/WG11 ), JCTVC-G264, No. m21824, Nov. 25, 2011 (Nov. 25, 2011), XP030050387, total 12 pages.

Kim(LG) J: "AHG7: The performance of extended intra chroma prediction for non 4:2:0 format", (Joint Collaborative Team on Video Coding of ISO/IEC JTC1/SC29/WG11 and ITU-T SG.16 ), No. JCTVC-L0240, Jan. 8, 2013 (Jan. 8, 2013), XP030113728, total 5 pages.

Woong Il Choi et al., Macroblock-level adaptive dynamic resolution conversion technique. Proc. SPIE 6391, Multimedia Systems and Applications IX, 639103, Oct. 2, 2006, 9 pages.

W. Lin et al., Adaptive downsampling to improve image compression at low bit rates. IEEE Transactions on Image Processing, vol. 15, No. 9, Sep. 2006, 9 pages.

Jie Dong et al., Adaptive downsampling for high-definition video coding. 2012 19th IEEE International Conference on Image Processing, Feb. 21, 2013, 4 pages.

Oren Rippel et al., Real-Time Adaptive Image Compression. Proceedings of the 34 th International Conference on Machine Learning, Sydney, Australia, May 16, 2017, 16 pages.

Wikipedia, VC-1. retrieved from https://en.wikipedia.org/wiki/VC-1, Jan. 21, 2021, 7 pages.

Mei Guo et al, "Intra Chroma LM Mode with Reduced Line Buffer", Joint Collaborative Team on Video Coding (JCT-VC) of ITU-T SG16 WP3 and ISO/IEC JTC1/SC29/WG11, 6th Meeting: Torino, Italy, Jul. 14-22, 2011, Document: JCTVC-F121, total 4 pages.

\* cited by examiner

200

---

Obtain luma information and chroma information of a to-be-processed image block, first processing information, and second processing information, where the first processing information is used to indicate a downsampling processing manner used for a luma component of the to-be-processed image block, and the second processing information is used to indicate a downsampling processing manner used for a chroma component of the to-be-processed image block — 210

Reconstruct a transient luma block of the to-be-processed image block based on the luma information of the to-be-processed image block, where resolution of the transient luma block is determined by using a sampling format of the to-be-processed image block and the first processing information — 220

Obtain a prediction block of a transient chroma block of the to-be-processed image block based on the resolution of the transient luma block, the sampling format of the to-be-processed image block, and the second processing information, where the resolution of the transient luma block is the same as resolution of the transient chroma block, and the resolution of the transient chroma block is determined by using the sampling format of the to-be-processed image block and the second processing information — 230

CHROMA PREDICTION METHOD AND DEVICE

CROSS-REFERENCE TO RELATED APPLICATIONS

This application is a continuation of U.S. application Ser. No. 16/744,987, filed on Jan. 16, 2020, which is a continuation of International Application No. PCT/CN2018/087836, filed on May 22, 2018, which claims priority to Chinese Patent Application No. 201710582094.1, filed on Jul. 17, 2017, the disclosures of which are incorporated herein by reference in their entireties.

TECHNICAL FIELD

This application relates to the field of image processing, and more specifically, to a chroma prediction method and device.

BACKGROUND

Digital video compression encoding and decoding technologies are widely applied to the broadcasting field, the communications field, the storage field, and the multimedia service field. Original video content obtained by a collection device has a relatively large amount of data and is not suitable for storage and transmission. Therefore, an efficient video compression encoding technology needs to be used to compress original data. Some details may be lost when downsampling is performed on an entire image. Consequently, chroma prediction in a video encoding/decoding process is not accurate enough, and a reconstructed image is blurred.

Therefore, how to improve accuracy of the chroma prediction in the video encoding/decoding process and improve quality of the reconstructed image is an urgent problem to be resolved.

SUMMARY

This application provides a chroma prediction method and device, to improve accuracy of chroma prediction in a video encoding/decoding process, and improve quality of a reconstructed image.

According to a first aspect, a chroma prediction method is provided, including: obtaining luma information and chroma information of a to-be-processed image block, first processing information, and second processing information, where the first processing information is used to indicate a downsampling processing manner used for a luma component of the to-be-processed image block, and the second processing information is used to indicate a downsampling processing manner used for a chroma component of the to-be-processed image block;
  reconstructing a transient luma block of the to-be-processed image block based on the luma information of the to-be-processed image block, where resolution of the transient luma block is determined by using a sampling format of the to-be-processed image block and the first processing information; and
  obtaining a prediction block of a transient chroma block of the to-be-processed image block based on the resolution of the transient luma block, the sampling format of the to-be-processed image block, and the second processing information, where the resolution of the transient luma block is the same as resolution of the transient chroma block, and the resolution of the transient chroma block is determined by using the sampling format of the to-be-processed image block and the second processing information.

Therefore, in this application, the luma information and the chroma information of the to-be-processed image block, the first processing information, and the second processing information are first obtained. Then the transient luma block of the to-be-processed image block is reconstructed based on the luma information of the to-be-processed image block. Then, the prediction block of the transient chroma block of the to-be-processed image block is obtained based on the resolution of the transient luma block, the sampling format of the to-be-processed image block, and the second processing information. The transient luma block of the to-be-processed image block is used to predict chroma of the to-be-processed image block, and an image processing manner is performed at an image block level. Therefore, an image block characteristic in different areas of an image is better adapted, accuracy of chroma prediction in a video encoding/decoding process can be improved, and quality of a reconstructed image can be improved.

In one embodiment, the first processing information is used to indicate a downsampling processing manner used for a luma component of the to-be-processed image block includes:
  the first processing information is used to indicate that downsampling is not performed on the luma component of the to-be-processed image block; or the first processing information is used to indicate a filter that performs downsampling on the luma component of the to-be-processed image block.

In this case, the sampling manner used for the luma component of the to-be-processed image block may be learned of by using the first processing information. Different to-be-processed image blocks may have different luma characteristics. Different sampling manners are selected to process luma components of different to-be-processed image blocks, so as to reduce an image quality loss.

In one embodiment, the second processing information is used to indicate a downsampling processing manner used for a chroma component of the to-be-processed image block includes:
  the second processing information is used to indicate that downsampling is not performed on the chroma component of the to-be-processed image block; or the second processing information is used to indicate a filter that performs downsampling on the chroma component of the to-be-processed image block.

In this case, the sampling manner used for the chroma component of the to-be-processed image block may be learned of by using the second processing information. Different to-be-processed image blocks may have different chroma characteristics. Different sampling manners are selected to process chroma components of different to-be-processed image blocks, so as to reduce an image quality loss.

In one embodiment, obtaining a prediction block of a transient chroma block of the to-be-processed image block based on the resolution of the transient luma block, the sampling format of the to-be-processed image block, and the second processing information includes:
  determining the resolution of the transient chroma block based on the sampling format of the to-be-processed image block and the second processing information;
  when the resolution of the transient chroma block is different from the resolution of the transient luma block, adjusting the resolution of the transient luma block, so that resolution of the adjusted transient luma block is the same as the resolution of the transient chroma block, and using the adjusted transient luma block as a target block of the transient chroma block, or when the resolution of the transient chroma block is the same as the resolution of the transient luma block, maintaining the resolution of the transient luma block, and using the transient luma block as a target block of the transient chroma block; and obtaining the prediction block of the transient chroma block based on the target block of the transient chroma block.

In this case, the prediction block of the transient chroma block is obtained based on the target block of the transient chroma block. Space-domain correlation of a video image is used, to remove spatial redundancy of a video, thereby reducing a bit rate required for encoding.

In one embodiment, adjusting the resolution of the transient luma block includes:

when the resolution of the transient chroma block is lower than the resolution of the transient luma block, performing downsampling on the transient luma block based on the resolution of the transient chroma block, so that the resolution of the adjusted transient luma block is the same as the resolution of the transient chroma block; or when the resolution of the transient chroma block is higher than the resolution of the transient luma block, performing upsampling on the transient luma block based on the resolution of the transient chroma block, so that the resolution of the adjusted transient luma block is the same as the resolution of the transient chroma block.

In this case, the upsampling or downsampling adjustment is performed on the transient luma block based on the resolution of the transient chroma block, so that the resolution of the adjusted transient luma block is the same as the resolution of the transient chroma block.

In one embodiment, when the resolution of the transient chroma block is the same as the resolution of the transient luma block, the maintaining the resolution of the transient luma block, and using the transient luma block as a target block of the transient chroma block includes:

when a location of a sampling point of the transient chroma block is different from a location of a sampling point of the transient luma block, performing an interpolation operation on the transient luma block based on the location of the sampling point of the transient chroma block and the location of the sampling point of the transient luma block, to obtain a corrected transient luma block; and using the corrected transient luma block as the target block of the transient chroma block.

In one embodiment, adjusting the resolution of the transient luma block includes:

adjusting horizontal resolution of the transient luma block, so that horizontal resolution of the adjusted transient luma block is the same as horizontal resolution of the transient chroma block; and adjusting vertical resolution of the transient luma block, so that vertical resolution of the adjusted transient luma block is the same as vertical resolution of the transient chroma block.

In one embodiment, obtaining the prediction block of the transient chroma block based on the target block of the transient chroma block includes:

obtaining a prediction pixel value of the transient chroma block based on a reconstructed pixel value of the target block, an adjacent reconstructed pixel value of the target block, and an adjacent reconstructed pixel value of the transient chroma block.

In this case, the prediction pixel value of the transient chroma block is obtained based on the reconstructed pixel value of the target block, the adjacent reconstructed pixel value of the target block, and the adjacent reconstructed pixel value of the transient chroma block. Space-domain correlation of a video image is used, to remove spatial redundancy of a video, thereby reducing a bit rate required for encoding.

In one embodiment, the method further includes:

performing first upsampling processing on the transient luma block based on the first processing information, to obtain a reconstructed luma block of the to-be-processed image block, where the first upsampling processing is reverse processing of downsampling processing that is indicated by the first processing information and performed on the luma component of the to-be-processed image block.

In one embodiment, the method further includes:

reconstructing the transient chroma block based on the chroma information of the to-be-processed image block and the prediction block; and performing second upsampling processing on the transient chroma block based on the second processing information, to obtain a reconstructed chroma block of the to-be-processed image block, where the second upsampling processing is reverse processing of downsampling processing that is indicated by the second processing information and performed on the chroma component of the to-be-processed image block.

In one embodiment, the method is used to decode the to-be-processed image block, and the obtaining luma information and chroma information of a to-be-processed image block, first processing information, and second processing information includes:

obtaining the luma information and the chroma information from a bitstream; and obtaining the first processing information and the second processing information from the bitstream;

obtaining the first processing information from the bitstream and obtaining preset second processing information;

obtaining the second processing information from the bitstream and obtaining preset first processing information; or obtaining preset first processing information and preset second processing information.

In one embodiment, the method is used to encode the to-be-processed image block, and the obtaining luma information and chroma information of a to-be-processed image block, first processing information, and second processing information includes:

separately calculating encoding costs of the to-be-processed image block that are determined by using at least one piece of candidate first processing information and at least one piece of candidate second processing information;

determining candidate first processing information and candidate second processing information that are corresponding to minimum encoding costs as the obtained first processing information and the obtained second processing information; and encoding the to-be-processed image block based on the obtained first processing information and the obtained second processing information, to obtain the luma information and the chroma information of the to-be-processed image block.

In this case, the encoding costs of the to-be-processed image block that are determined by using the at least one piece of candidate first processing information and the at least one piece of candidate second processing information are determined, and the candidate first processing information and the candidate second processing information that are corresponding to the minimum coding costs are determined as the obtained first processing information and the obtained second processing information. This reduces a bit rate required for encoding a current to-be-processed image, and reduces storage space and network resources.

In one embodiment, the method further includes:

encoding the obtained first processing information, the obtained second processing information, the obtained luma information, and the obtained chroma information into a bitstream.

According to a second aspect, a chroma prediction device is provided, including an obtaining module and a reconstruction module. The obtaining module and the reconstruction module may perform the method according to the first aspect or any embodiment of the first aspect.

According to a third aspect, a chroma prediction device is provided, including a memory, a transceiver, and a processor. The memory stores program code that may be used to instruct to perform the first aspect or any embodiment of the first aspect. The transceiver is configured to receive and send a specific signal after being driven by the processor. When the code is executed, the processor may implement the operations performed by the terminal device in the method.

According to a fourth aspect, a computer storage medium is provided. The computer storage medium stores program code, and the program code may be used to indicate performing of the method in the first aspect or any embodiment of the first aspect.

BRIEF DESCRIPTION OF DRAWINGS

FIG. 2 is a schematic flowchart of a chroma prediction method according to one embodiment;

DESCRIPTION OF EMBODIMENTS

The following describes the technical solutions in this application with reference to the accompanying drawings.

Figure 1:
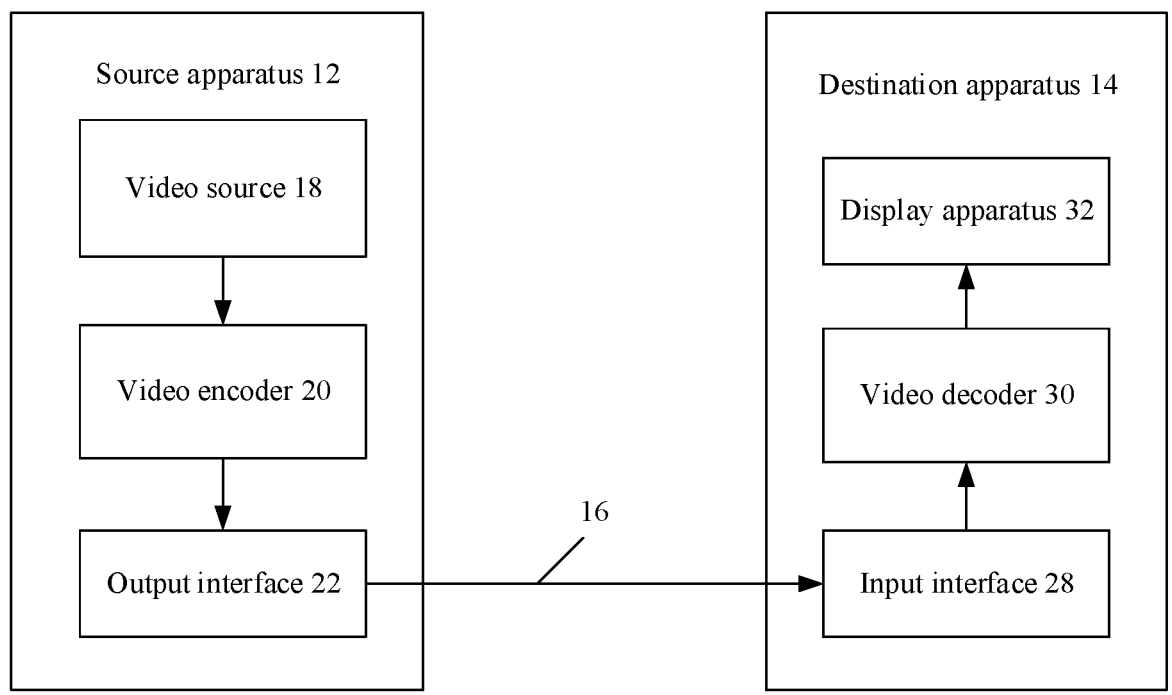
FIG. 1 is a schematic block diagram of a video encoding/decoding system according to one embodiment.

FIG. 1 is a schematic block diagram of a video encoding/decoding system 100 according to one embodiment. As shown in FIG. 1, the video encoding/decoding system 100 includes a source apparatus 12 and a destination apparatus 14. The source apparatus 12 generates encoded video data. Therefore, the source apparatus 12 may be referred to as a video encoding apparatus or a video encoding device. The destination apparatus 14 may decode the encoded video data generated by the source apparatus 12. Therefore, the destination apparatus 14 may be referred to as a video decoding apparatus or a video decoding device. The source apparatus 12 and the destination apparatus 14 may be an embodiment of a video encoding/decoding apparatus or a video encoding/decoding device. The source apparatus 12 and the destination apparatus 14 may include a wide range of apparatuses including a desktop computer, a mobile computing apparatus, a notebook (for example, laptop) computer, a tablet computer, a set-top box, a handheld phone such as a smartphone, a television, a camera, a display apparatus, a digital media player, a video game console, an in-vehicle computer, and a similar apparatus.

The destination apparatus 14 may receive the encoded video data from the source apparatus 12 through a channel 16. The channel 16 may include one or more media and/or apparatuses capable of moving the encoded video data from the source apparatus 12 to the destination apparatus 14. In an embodiment, the channel 16 may include one or more communications media that enable the source apparatus 12 to directly transmit the encoded video data to the destination apparatus 14 in real time. In this embodiment, the source apparatus 12 may modulate the encoded video data according to a communications standard (for example, a wireless communications protocol), and may transmit modulated video data to the destination apparatus 14. The one or more communications media may include wireless and/or wired communications media, for example, a radio frequency (RF) spectrum or one or more physical transmission lines. The one or more communications media may form a part of a packet-based network (such as a local area network, a wide area network, or a global network (for example, the internet)). The one or more communications media may include a router, a switch, a base station, or another device that boosts communication from the source apparatus 12 to the destination apparatus 14.

In another embodiment, the channel 16 may include a storage medium that stores the encoded video data generated by the source apparatus 12. In this embodiment, the destination apparatus 14 may access the storage medium through disk access or card access. The storage medium may include a plurality of types of locally accessible data storage media such as a Blu-ray disc, a DVD, a CD-ROM, a flash memory, or another proper digital storage medium configured to store encoded video data.

In another embodiment, the channel 16 may include a file server or another intermediate storage apparatus that stores the encoded video data generated by the source apparatus 12. In this embodiment, the destination apparatus 14 may access, through streaming transmission or downloading, the encoded video data stored in the file server or the another intermediate storage apparatus. The file server may be a type of a server that can store the encoded video data and transmit the encoded video data to the destination apparatus 14. The file server in this embodiment includes a web server (for example, used for a website), a file transfer protocol (FTP) server, a network-attached storage (NAS) apparatus, and a local disk drive.

The destination apparatus 14 may access the encoded video data through a standard data connection (for example, an internet connection). An example type of the data connection includes a wireless channel (for example, Wireless Fidelity or Wi-Fi connection), a wired connection (for example, a digital subscriber line (DSL), a cable modem), or a combination thereof used for accessing the encoded video data stored in the file server. The encoded video data may be transmitted from the file server through the streaming transmission, the downloading transmission, or a combination thereof.

The technology of this application is not limited to being applied to a wireless scenario. For example, the technology may be applied to supporting encoding/decoding of videos in a plurality of multimedia applications such as the following applications: over-the-air television broadcast, wireless television transmission, and satellite television transmission, streaming video transmission (for example, through the internet), encoding of video data stored in a data storage medium, decoding of video data stored in a data storage medium, or other applications. In some embodiments, the video encoding/decoding system 100 may be configured to support unidirectional or bidirectional video transmission, to support applications such as streaming video transmission, video play, video broadcast, and/or a video call.

In an example in FIG. 1, the source apparatus 12 includes a video source 18, a video encoder 20, and an output interface 22. In some embodiments, the output interface 22 may include a modulator/demodulator (e.g., a modem) and/or a transmitter. The video source 18 may include a video capture apparatus (for example, a video camera), a video archive including previously captured video data, a video input interface configured to receive video data from a video content provider, and/or a computer graphics system configured to generate video data, or a combination of the foregoing video data sources.

The video encoder 20 may encode video data from the video source 18. In some embodiments, the source apparatus 12 directly transmits the encoded video data to the destination apparatus 14 through the output interface 22. Alternatively, the encoded video data may be stored in the storage medium or the file server, so that the destination apparatus 14 subsequently accesses the encoded video data for decoding and/or playing.

In an example in FIG. 1, the destination apparatus 14 includes an input interface 28, a video decoder 30, and a display apparatus 32. In some embodiments, the input interface 28 includes a receiver and/or a modem. The input interface 28 may receive the encoded video data through the channel 16. The display apparatus 32 may be integrated with the destination apparatus 14 or may be located outside the destination apparatus 14. The display apparatus 32 usually displays decoded video data. The display apparatus 32 may include a plurality of types of display apparatuses, for example, a liquid crystal display (LCD), a plasma display, an organic light-emitting diode (OLED) display, or a display apparatus of another type.

The video encoder 20 and the video decoder 30 operate according to a video compression standard (for example, the high efficiency video encoding and decoding standard H.265), and can conform to a high efficiency video coding (HEVC) test model (HM).

To better understand this application, this application is described below with reference to FIG. 2 to FIG. 11 by using a system the same as or similar to the system shown in FIG. 1 as an example.

FIG. 2 is a schematic flowchart of a chroma prediction method 200 according to one embodiment. As shown in FIG. 2, the following content is included in the method 200.

210. Obtain luma information and chroma information of a to-be-processed image block, first processing information, and second processing information, where the first processing information is used to indicate a downsampling processing manner used for a luma component of the to-be-processed image block, and the second processing information is used to indicate a downsampling processing manner used for a chroma component of the to-be-processed image block.

In one embodiment, when the chroma component of the to-be-processed image block is independently processed, the method further includes obtaining third processing information. The second processing information is used to indicate a downsampling processing manner used for a first chroma component of the to-be-processed image block. The third processing information is used to indicate a downsampling processing manner used for a second chroma component of the to-be-processed image block.

In one embodiment, color information of the to-be-processed image block is represented by using YCbCr color space, where Y represents luma, which is also referred to as a luma component; Cb and Cr represent chroma, and are used to represent a hue and saturation of a pixel, and Cb and Cr are collectively referred to as a chroma component. In this case, the luma Y is established by using input signals RGB (red, green, and blue), and a method is superposing the RGB signals together according to a specific proportion; Cb represents a difference between the blue part of the input RGB signals and a signal luma value, and Cr represents a difference between the red part of the input RGB signals and a signal luma value.

When downsampling processing is performed on the chroma components Cb and Cr as a whole, one piece of processing information is used to indicate a downsampling processing manner used for the chroma component of the to-be-processed image block. For example, the second processing information is used to indicate the downsampling processing manner used for the chroma component of the to-be-processed image block. When downsampling processing is independently performed on the chroma components Cb and Cr, two pieces of processing information may be respectively used to indicate a downsampling processing manner used for the chroma component Cb of the to-be-processed image block and a downsampling processing manner used for the chroma component Cr of the to-be-processed image block. For example, the second processing information is used to indicate the downsampling processing manner used for the chroma component Cb of the to-be-processed image block, and the third processing information is used to indicate the downsampling processing manner used for the chroma component Cr of the to-be-processed image block.

In one embodiment, the first processing information is used to indicate a downsampling processing manner used for a luma component of the to-be-processed image block includes:

the first processing information is used to indicate that downsampling is not performed on the luma component of the to-be-processed image block; or the first processing information is used to indicate a filter that performs downsampling on the luma component of the to-be-processed image block.

In one embodiment, the first processing information carries identifier information. The identifier information may be used to indicate whether the downsampling is performed on the luma component of the to-be-processed image block. For example, when the identifier information is 0, it indicates that the downsampling is not performed on the luma component of the to-be-processed image block; when the identifier information is 1, it indicates that the downsampling is performed on the luma component of the to-be-processed image block.

In one embodiment, when the identifier information in the first processing information indicates that the downsampling is performed on the luma component of the to-be-processed image block, the first processing information further includes index information. The index information is used to indicate the filter that performs the downsampling on the luma component of the to-be-processed image block. For example, when the index information is 1, it indicates that the filter that performs the downsampling on the luma component of the to-be-processed image block is a filter 1; when the index information is 2, it indicates that the filter that performs the downsampling on the luma component of the to-be-processed image block is a filter 2.

In one embodiment, the index information may also be used to indicate that the downsampling is not performed on the luma component of the to-be-processed image block. When the index information is 0, it indicates that the downsampling is not performed on the luma component of the to-be-processed image block. If 2:1 downsampling is performed on the luma component of the to-be-processed image block, the index information is 1. When 4:1 downsampling is performed on the luma component of the to-be-processed image block, the index information is 2.

In one embodiment, the first processing information is used to indicate the filter that performs the downsampling on the luma component of the to-be-processed image block. A filter that performs upsampling on the to-be-processed image block is determined based on the filter that is indicated by the first processing information and that performs the downsampling on the luma component of the to-be-processed image block.

In one embodiment, a relationship between an upsampling filter and a downsampling filter may be pre-established. For example, a downsampling filter 1 is corresponding to an upsampling filter 1, and a downsampling filter 2 is corresponding to an upsampling filter 2. If the first processing information indicates the downsampling filter 1, the upsampling filter 1 is selected based on the first processing information and the pre-established relationship between the upsampling filter and the downsampling filter, to perform upsampling on the to-be-processed image block. Alternatively, the first processing information may be at least one of a model, a quantity of taps, or a coefficient of a filter. A model of the downsampling filter may indicate a 3-lobe Lanczos filter, a bilinear filter, a bicubic filter, a Gauss filter, or the like. The upsampling filter may be a DCTIF filter, a bilinear interpolation filter, a sinc filter, or the like.

In this case, the sampling manner used for the luma component of the to-be-processed image block may be learned of by using the first processing information. Different to-be-processed image blocks may have different luma characteristics. Different sampling manners are selected to process luma components of different to-be-processed image blocks, so as to reduce an image quality loss.

In one embodiment, the second processing information is used to indicate a downsampling processing manner used for a chroma component of the to-be-processed image block includes:

the second processing information is used to indicate that downsampling is not performed on the chroma component of the to-be-processed image block; or the second processing information is used to indicate a filter that performs downsampling on the chroma component of the to-be-processed image block.

In one embodiment, the second processing information carries identifier information. The identifier information may be used to indicate whether the downsampling is performed on the chroma component of the to-be-processed image block. For example, when the identifier information is 0, it indicates that the downsampling is not performed on the chroma component of the to-be-processed image block; when the identifier information is 1, it indicates that the downsampling is performed on the chroma component of the to-be-processed image block.

In one embodiment, when the identifier information in the second processing information indicates that the downsampling is performed on the chroma component of the to-be-processed image block, the second processing information further includes index information. The index information is used to indicate the filter that performs the downsampling on the chroma component of the to-be-processed image block. For example, when the index information is 1, it indicates that the filter that performs the downsampling on the chroma component of the to-be-processed image block is a filter 1; when the index information is 2, it indicates that the filter that performs the downsampling on the chroma component of the to-be-processed image block is a filter 2.

In one embodiment, the index information may also be used to indicate that the downsampling is not performed on the chroma component of the to-be-processed image block. When the index information is 0, it indicates that the downsampling is not performed on the chroma component of the to-be-processed image block. If 2:1 downsampling is performed on the chroma component of the to-be-processed image block, the index information is 1. When 4:1 downsampling is performed on the chroma component of the to-be-processed image block, the index information is 2.

In one embodiment, the second processing information is used to indicate the filter that performs the downsampling on the chroma component of the to-be-processed image block. A filter that performs upsampling on the to-be-processed image block is determined based on the filter that is indicated by the second processing information and that performs the downsampling on the chroma component of the to-be-processed image block.

In one embodiment, a relationship between an upsampling filter and a downsampling filter may be pre-established. For example, a downsampling filter 3 is corresponding to an upsampling filter 3, and a downsampling filter 4 is corresponding to an upsampling filter 4. If the first processing information indicates the downsampling filter 3, the upsampling filter 3 is selected based on the first processing information and the pre-established relationship between the upsampling filter and the downsampling filter, to perform upsampling on the to-be-processed image block. Alternatively, the first processing information may be at least one of a model, a quantity of taps, or a coefficient of a filter. A model of the downsampling filter may indicate a 3-lobe Lanczos filter, a bilinear filter, a bicubic filter, a Gauss filter, or the like. The upsampling filter may be a DCTIF filter, a bilinear interpolation filter, a sinc filter, or the like.

In this case, the sampling manner used for the chroma component of the to-be-processed image block may be learned of by using the second processing information. Different to-be-processed image blocks may have different chroma characteristics, and different sampling manners are selected to process chroma components of the different to-be-processed image blocks, so as to reduce an image quality loss.

220. Reconstruct a transient luma block of the to-be-processed image block based on the luma information of the to-be-processed image block, where resolution of the transient luma block is determined by using a sampling format of the to-be-processed image block and the first processing information.

In one embodiment, a quantization coefficient for parsing the luma component of the to-be-processed image block is obtained, dequantization is performed on the quantization coefficient to obtain a transform coefficient, and inverse transform is performed on the transform coefficient to obtain a reconstruction residual of the luma component of the to-be-processed image block. A prediction pixel of the luma component of the to-be-processed image block is generated based on an adjacent reconstructed pixel of the luma component of the to-be-processed image block. The prediction pixel and the reconstruction residual are added, to obtain the transient luma block of the to-be-processed image block. The transient luma block of the to-be-processed image block is a reconstructed pixel of the to-be-processed image block.

Because a human eye is less sensitive to a chroma signal than a luma signal, downsampling is usually performed on chroma of an image during an application. By using this method, information that expresses a color in the image may be removed without being perceived by a person, so as to compress data. Common YCbCr sampling formats are 4:4:4, 4:2:2, and 4:2:0.

Figure 3:
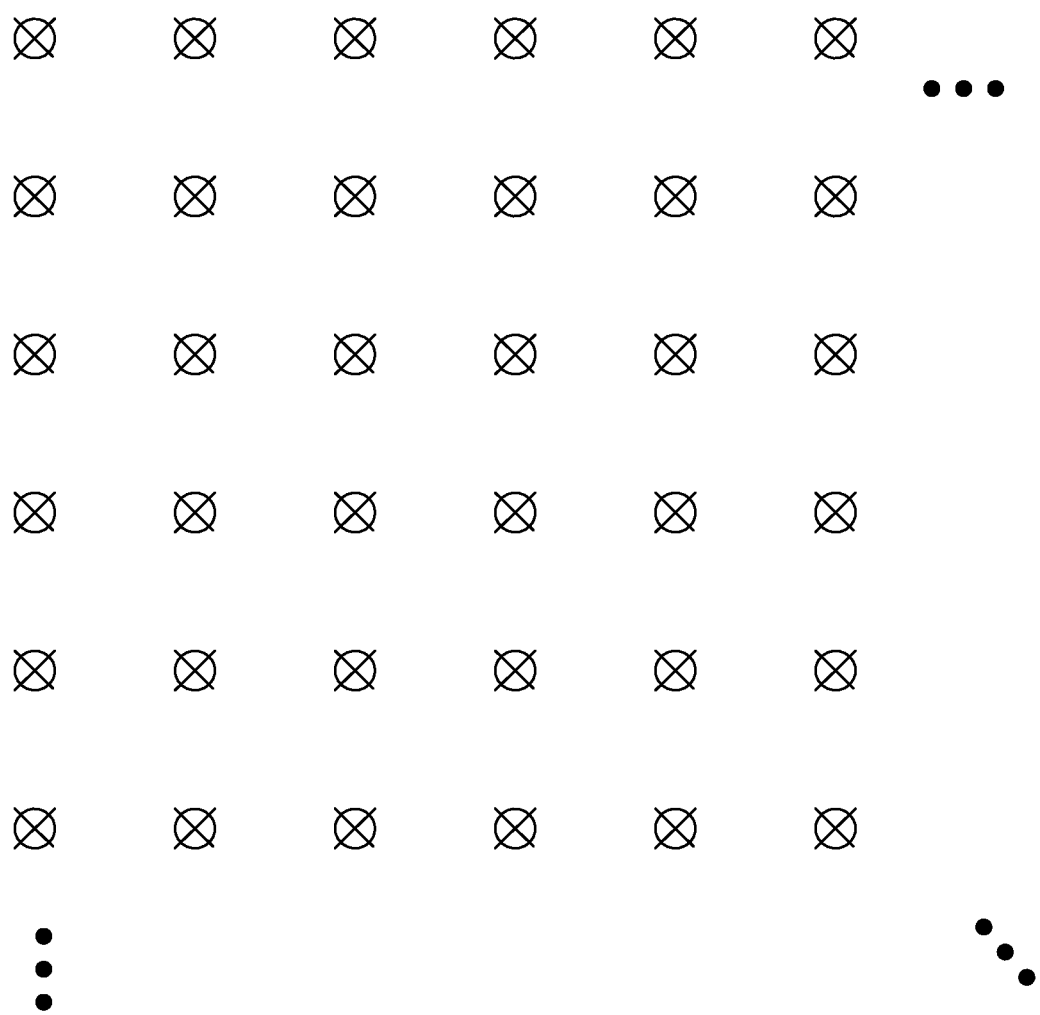
FIG. 3 is a schematic diagram of a location based on a YCbCr sampling format 4:4:4 according to one embodiment.

FIG. 3 is a schematic diagram of a location based on a YCbCr sampling format 4:4:4 according to one embodiment. Each pixel location has components Y, Cb, and Cr. To be specific, regardless of a horizontal direction or a vertical direction, every four Y luma sampling points are corresponding to four Cb chroma sampling points and four Cr chroma sampling points. In this format, a chroma component and a luma component have same spatial resolution. This format is applicable when a video source device processes a high-quality video signal.

Figure 4:
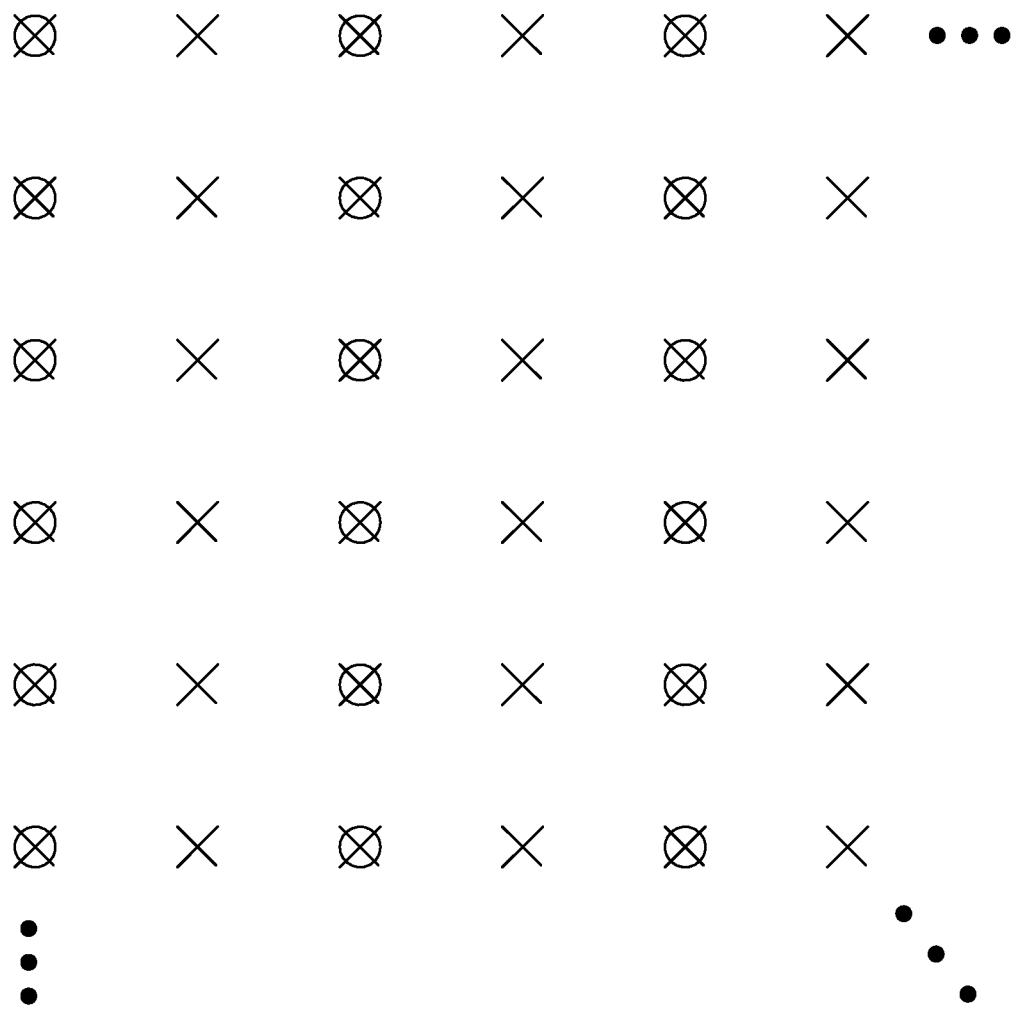
FIG. 4 is a schematic diagram of a location based on a YCbCr sampling format 4:2:2 according to one embodiment.

FIG. 4 is a schematic diagram of a location based on a YCbCr sampling format 4:2:2 according to one embodiment. In a horizontal direction, every two Y luma sampling points are corresponding to one Cb chroma sampling point and one Cr chroma sampling point. When an image is displayed, a sampling point location without Cb and Cr is obtained through interpolation calculation by using surrounding adjacent Cb and Cr sampling points. In this format, a chroma component and a luma component have same vertical resolution. However, horizontal resolution of the chroma component is only half of horizontal resolution of the luma component. This is a standard format for a color television.

Figure 5:
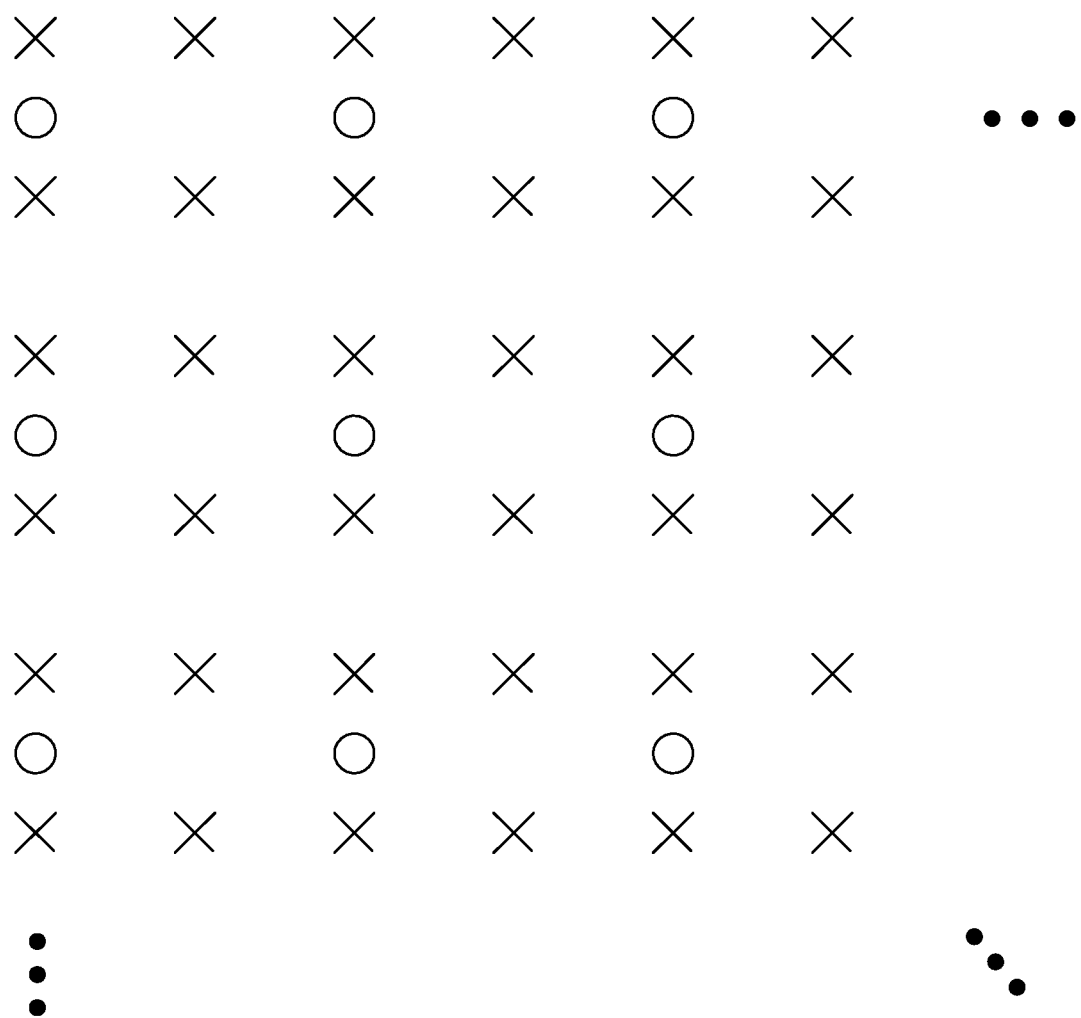
FIG. 5 is a schematic diagram of a location based on a YCbCr sampling format 4:2:0 according to one embodiment.

FIG. 5 is a schematic diagram of a location based on a YCbCr sampling format 4:2:0 according to one embodiment. 2:1 sampling is performed on a chroma component in both horizontal and vertical directions. To be specific, every four Y sampling points are corresponding to one Cb sampling point and one Cr sampling point. In this format, resolution of the chroma component in both horizontal and vertical directions is ½ of resolution of a luma component in both horizontal and vertical directions. This is a format frequently used in video encoding.

For example, if original resolution of the current to-be-processed image block is 8×8 (which is merely used as an example herein, and actual resolution is quite high), a sampling format of the to-be-processed image block is 4:2:0. The first processing information indicates that downsampling is performed on the luma component of the to-be-processed image block, downsampling rates in both a horizontal direction and a vertical direction are 2:1. Downsampling points are a left sampling point and an upper sampling point, and the resolution of the transient luma block of the to-be-processed image block is 4×4.

230. Obtain a prediction block of a transient chroma block of the to-be-processed image block based on the resolution of the transient luma block, the sampling format of the to-be-processed image block, and the second processing information, where the resolution of the transient luma block is the same as resolution of the transient chroma block, and the resolution of the transient chroma block is determined by using the sampling format of the to-be-processed image block and the second processing information.

In one embodiment, obtaining a prediction block of a transient chroma block of the to-be-processed image block based on the resolution of the transient luma block, the sampling format of the to-be-processed image block, and the second processing information includes:

determining the resolution of the transient chroma block based on the sampling format of the to-be-processed image block and the second processing information;

when the resolution of the transient chroma block is different from the resolution of the transient luma block, adjusting the resolution of the transient luma block, so that resolution of the adjusted transient luma block is the same as the resolution of the transient chroma block, and using the adjusted transient luma block as a target block of the transient chroma block, or when the resolution of the transient chroma block is the same as the resolution of the transient luma block, maintaining the resolution of the transient luma block, and using the transient luma block as a target block of the transient chroma block; and obtaining the prediction block of the transient chroma block based on the target block of the transient chroma block.

In this case, the prediction block of the transient chroma block is obtained based on the target block of the transient chroma block. Space-domain correlation of a video image is used, to remove spatial redundancy of a video, thereby reducing a bit rate required for encoding.

In one embodiment, adjusting the resolution of the transient luma block includes:

when the resolution of the transient chroma block is lower than the resolution of the transient luma block, performing downsampling on the transient luma block based on the resolution of the transient chroma block, so that the resolution of the adjusted transient luma block is the same as the resolution of the transient chroma block; or when the resolution of the transient chroma block is higher than the resolution of the transient luma block, performing upsampling on the transient luma block based on the resolution of the transient chroma block, so that the resolution of the adjusted transient luma block is the same as the resolution of the transient chroma block.

In one embodiment, when the resolution of the transient chroma block is 8×8, and the resolution of the transient luma block is 16×16, the resolution of the transient chroma block is lower than the resolution of the transient luma block. In this case, downsampling is performed on the transient luma block based on the resolution of the transient chroma block, where a downsampling rate is 2:1, and the resolution of the transient luma block after the downsampling is 8×8, and is the same as the resolution of the transient chroma block.

When the resolution of the transient chroma block is 16×16, and the resolution of the transient luma block is 8×8, the resolution of the transient chroma block is higher than the resolution of the transient luma block. In this case, upsampling is performed on the transient luma block based on the resolution of the transient chroma block, where an upsampling rate is 1:2, and the resolution of the transient luma block after the upsampling is 16×16, and is the same as the resolution of the transient chroma block.

For example, a YCbCr sampling format of the to-be-processed image block is 4:2:0. Original-resolution encoding is performed on the luma component of the to-be-processed image block, and encoding is performed on the chroma component of the to-be-processed image block after downsampling is performed on the chroma component by using a sampling rate of 2:1 (sampling points are a left sampling point and an upper sampling point). It can be learned from FIG. 5 that the resolution of the transient chroma block is different from the resolution of the transient luma block, and the resolution of the transient chroma block is lower than the resolution of the transient luma block. In this case, downsampling is performed on the transient luma block based on the resolution of the transient chroma block, where a downsampling rate is 4:1, and the resolution of the transient luma block after the downsampling is the same as the resolution of the transient chroma block.

For another example, a YCbCr sampling format of the to-be-processed image block is 4:2:0. Encoding is performed on the luma component of the to-be-processed image block after downsampling is performed on the luma component by using a sampling rate of 4:1 (sampling points are a left sampling point and an upper sampling point), and original-resolution encoding is performed on the chroma component of the to-be-processed image block. It can be learned from FIG. 5 that the resolution of the transient chroma block is different from the resolution of the transient luma block, and the resolution of the transient chroma block is higher than the resolution of the transient luma block. In this case, upsampling is performed on the transient luma block based on the resolution of the transient chroma block, where an upsampling rate is 1:2, and the resolution of the transient luma block after the upsampling is the same as the resolution of the transient chroma block.

It should be understood that a downsampling encoding mode may be adaptively selected for the luma component and the chroma component of the to-be-processed image block. There are four possible encoding modes for each image block: luma and chroma original-resolution encoding, luma and chroma downsampling, luma downsampling and chroma original-resolution encoding, and luma original-resolution encoding and chroma downsampling.

In one embodiment, when the resolution of the transient chroma block is the same as the resolution of the transient luma block, the maintaining the resolution of the transient luma block, and using the transient luma block as a target block of the transient chroma block includes:
  when a location of a sampling point of the transient chroma block is different from a location of a sampling point of the transient luma block, performing an interpolation operation on the transient luma block based on the location of the sampling point of the transient chroma block and the location of the sampling point of the transient luma block, to obtain a corrected transient luma block; and
  using the corrected transient luma block as the target block of the transient chroma block.

For example, a YCbCr sampling format of the to-be-processed image block is 4:2:0. Encoding is performed on the luma component of the to-be-processed image block after downsampling is performed on the luma component by using a sampling rate of 2:1 (sampling points are a left sampling point and an upper sampling point), and original-resolution encoding is performed on the chroma component of the to-be-processed image block. It can be learned from FIG. 5 that the resolution of the transient chroma block is the same as the resolution of the transient luma block, but a location of a sampling point of the transient chroma block is different from a location of a sampling point of the transient luma block.

An interpolation operation is performed on a reconstructed pixel of the transient luma block based on the location of the sampling point of the transient chroma block and the location of the sampling point of the transient luma block, to obtain a reconstructed pixel of the corrected transient luma block. The corrected transient luma block is used as the target block of the transient chroma block.

It should be understood that in this embodiment of this application, that the YCbCr format of the to-be-processed image block is 4:2:0 is merely used as an example. Alternatively, the YCbCr format of the to-be-processed image block may be 4:4:4 or 4:2:2. The YCbCr format of the to-be-processed image block is not limited in this application.

It should be understood that in this embodiment of this application, the sampling rate 2:1 or 4:1 for downsampling and an upsampling rate are merely used as examples. Alternatively, the downsampling rate and the upsampling rate may be another sampling rate. The sampling rate is not limited in this application.

It should be further understood that, that sampling rates for the downsampling in the horizontal direction and the vertical direction are the same is merely used as an example. Whether a downsampling rate in the horizontal direction and a downsampling rate in the vertical direction are the same is not limited in this application.

In one embodiment, adjusting the resolution of the transient luma block includes:
  adjusting horizontal resolution of the transient luma block, so that horizontal resolution of the adjusted transient luma block is the same as horizontal resolution of the transient chroma block; and
  adjusting vertical resolution of the transient luma block, so that vertical resolution of the adjusted transient luma block is the same as vertical resolution of the transient chroma block.

In one embodiment, adjusting the resolution of the transient luma block includes adjusting the horizontal resolution of the transient luma block and the vertical resolution of the transient luma block, so that the horizontal resolution of the adjusted transient luma block is the same as the horizontal resolution of the transient chroma block, and the vertical resolution of the adjusted transient luma block is the same as the vertical resolution of the transient chroma block.

In one embodiment, obtaining a prediction block of the transient chroma block based on the target block of the transient chroma block includes:

obtaining a prediction pixel value of the transient chroma block based on a reconstructed pixel value of the target block, an adjacent reconstructed pixel value of the target block, and an adjacent reconstructed pixel value of the transient chroma block.

In one embodiment, in a research process of a next generation video standard, a new chroma prediction technology, that is, cross-component linear model prediction (CCLM), is proposed. In this technology, a chroma pixel is predicted by using a reconstructed luma pixel of a current image block, and redundancy between a luma component and a chroma component can be removed. The CCLM first establishes a luma/chroma correlation model of a current to-be-encoded image block based on an adjacent reconstructed luma pixel value and an adjacent reconstructed chroma pixel value of the current to-be-encoded image block. The correlation model is a linear model, and is represented by parameters $\alpha$ and $\beta$. A prediction chroma pixel value of the current to-be-encoded image block is generated based on the established luma/chroma correlation model of the current to-be-encoded image block and the reconstructed luma pixel value of the current to-be-encoded image block.

First, the luma/chroma correlation model of the to-be-encoded image block is established, in other words, values of the parameters $\alpha$ and $\beta$ are determined, and the adjacent reconstructed pixel value of the target block and the adjacent reconstructed pixel value of the transient chroma block are obtained. The adjacent reconstructed pixel value of the target block includes a reconstructed luma pixel value of an image block that is in an upper row and adjacent to the target block and a reconstructed luma pixel value of an image block that is in a left column and adjacent to the target block. The adjacent reconstructed pixel value of the transient chroma block includes a reconstructed chroma pixel value of an image block that is in an upper row and adjacent to the transient chroma block and a reconstructed chroma pixel value of an image block that is in a left column and adjacent to the transient chroma block.

Resolution and a location of a sampling point of a reconstructed luma pixel of the image block that is in the upper row and adjacent to the target block are the same as resolution and a location of a sampling point of a reconstructed chroma pixel of the image block that is in the upper row and adjacent to the transient chroma block. Resolution and a location of a sampling point of a reconstructed luma pixel of the image block that is in the left column and adjacent to the target block are the same as resolution and a location of a sampling point of a reconstructed chroma pixel of the image block that is in the left column and adjacent to the transient chroma block.

It should be understood that, if the resolution and the location of the sampling point of the reconstructed luma pixel of the image block that is in the upper row and adjacent to the target block are different from the resolution and the location of the sampling point of the reconstructed chroma pixel of the image block that is in the upper row and adjacent to the transient chroma block, the resolution and the location of the sampling point of the reconstructed luma pixel of the image block that is in the upper row and adjacent to the target block should be adjusted, so that resolution and a location of the sampling point of the reconstructed luma pixel of adjusted the image block that is in the upper row and adjacent to the target block are the same as the resolution and the location of the sampling point of the reconstructed chroma pixel of the image block that is in the upper row and adjacent to the transient chroma block. The adjustment may be upsampling, downsampling, or an interpolation operation performed based on the location of the sampling point. Likewise, the resolution and the location of the sampling point of the reconstructed luma pixel of the image block that is in the left column and adjacent to the target block, are adjusted based on the resolution and the location of the sampling point of the reconstructed chroma pixel of the image block that is in the left column and adjacent to the transient chroma block.

Values of the parameters $\alpha$ and $\beta$ are determined based on the reconstructed luma pixel value of the image block that is in the upper row and adjacent to the target block and the reconstructed chroma pixel value of the image block that is in the upper row and adjacent to the transient chroma block, and the reconstructed luma pixel value of the image block that is in the left column and adjacent to the target block and the reconstructed chroma pixel value of the image block that is in the left column and adjacent to the transient chroma block.

Then, the prediction pixel value of the transient chroma block is obtained based on the established luma/chroma correlation model and based on the reconstructed pixel value of the target block.

The reconstructed pixel value of the target block is used as a reference pixel $rec_L$, and the reference pixel $rec_L$ and the values of $\alpha$ and $\beta$ are substituted into formula (1) to obtain the prediction pixel value of the transient chroma block:

$$pred_c = \alpha \cdot rec_L + \beta \qquad (1)$$

In this case, the prediction pixel value of the transient chroma block is obtained based on the reconstructed pixel value of the target block, the adjacent reconstructed pixel value of the target block, and the adjacent reconstructed pixel value of the transient chroma block. Space-domain correlation of a video image is used, to remove spatial redundancy of a video, thereby reducing a bit rate required for encoding.

In one embodiment, the method further includes:

performing first upsampling processing on the transient luma block based on the first processing information, to obtain a reconstructed luma block of the to-be-processed image block, where the first upsampling processing is reverse processing of downsampling processing that is indicated by the first processing information and performed on the luma component of the to-be-processed image block.

In one embodiment, the first processing information indicates the downsampling processing manner used for the luma component of the to-be-processed image block. To obtain the reconstructed luma block of the to-be-processed image block, the upsampling processing is performed on the transient luma block. The upsampling processing manner is a reverse process of downsampling.

For example, a 2:1 downsampling processing manner is performed on the luma component of the to-be-processed image block. After the transient luma block is obtained, upsampling is performed on the transient luma block by using an upsampling rate of 1:2, to obtain the reconstructed luma block of the to-be-processed image block.

It should be understood that the upsampling processing manner and the downsampling are reverse, including that a location of a sampling point during the upsampling and a location of a sampling point during the downsampling are also reverse.

In one embodiment, the method further includes:
reconstructing the transient chroma block based on the chroma information of the to-be-processed image block and the prediction block; and
performing second upsampling processing on the transient chroma block based on the second processing information, to obtain a reconstructed chroma block of the to-be-processed image block, where the second upsampling processing is reverse processing of downsampling processing that is indicated by the second processing information and performed on the chroma component of the to-be-processed image block.

In one embodiment, the second processing information indicates the downsampling processing manner used for the chroma component of the to-be-processed image block. To obtain the reconstructed chroma block of the to-be-processed image block, the upsampling processing is performed on the transient chroma block. The upsampling processing manner is a reverse process of downsampling.

In one embodiment, the method is used to decode the to-be-processed image block, and the obtaining luma information and chroma information of the to-be-processed image block, first processing information, and second processing information includes:
obtaining the luma information and the chroma information from a bitstream; and
obtaining the first processing information and the second processing information from the bitstream;
obtaining the first processing information from the bitstream and obtaining preset second processing information;
obtaining the second processing information from the bitstream and obtaining preset first processing information; or
obtaining preset first processing information and preset second processing information.

In one embodiment, the first processing information and the second processing information include identifier information of an image area. The identifier information is used to indicate a use range of the first processing information and the second processing information. The range may include a part of the image area, an image block, or an image sub-block.

In one embodiment, the method is used to encode the to-be-processed image block, and the obtaining luma information and chroma information of the to-be-processed image block, first processing information, and second processing information includes:
separately calculating encoding costs of the to-be-processed image block that are determined by using at least one piece of candidate first processing information and at least one piece of candidate second processing information;
determining candidate first processing information and candidate second processing information that are corresponding to minimum encoding costs as the obtained first processing information and the obtained second processing information; and
encoding the to-be-processed image block based on the obtained first processing information and the obtained second processing information, to obtain the luma information and the chroma information of the to-be-processed image block.

In this case, the encoding costs of the to-be-processed image block that are determined by using the at least one piece of candidate first processing information and the at least one piece of candidate second processing information are determined, and the candidate first processing information and the candidate second processing information that are corresponding to the minimum coding costs are determined as the obtained first processing information and the obtained second processing information. This reduces a bit rate required for encoding a current to-be-processed image, and reduces storage space and network resources.

In one embodiment, the method further includes:
encoding the obtained first processing information, the obtained second processing information, the obtained luma information, and the obtained chroma information into a bitstream.

Therefore, in this application, first, the luma information and the chroma information of the to-be-processed image block, the first processing information, and the second processing information are obtained; then, the transient luma block of the to-be-processed image block is reconstructed based on the luma information of the to-be-processed image block; and the prediction block of the transient chroma block of the to-be-processed image block is obtained based on the resolution of the transient luma block, the sampling format of the to-be-processed image block, and the second processing information. The transient luma block of the to-be-processed image block is used to predict chroma of the to-be-processed image block, and an image processing manner is performed at an image block level. Therefore, an image block characteristic in different areas of an image is better adapted, accuracy of chroma prediction in a video encoding/decoding process can be improved, and quality of a reconstructed image can be improved.

To better understand a chroma prediction method in this application, the following separately describes the chroma prediction method in this application from perspectives of an encoder side and a decoder side.

Figure 6:
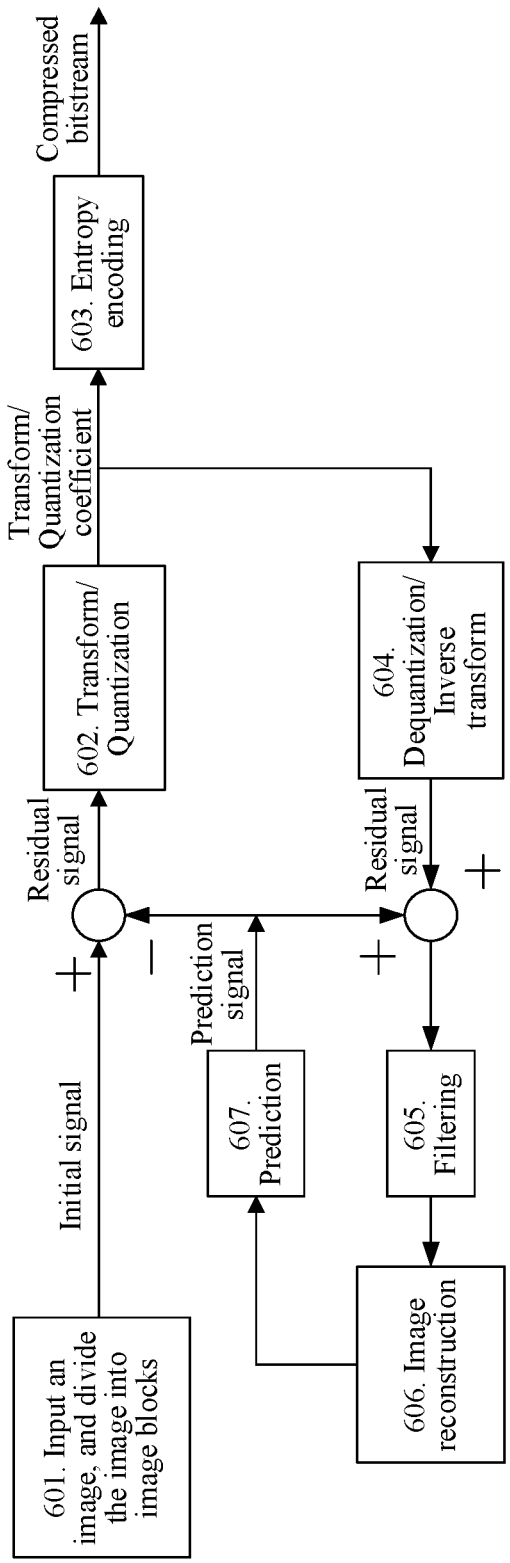
FIG. 6 is a schematic diagram of an encoding procedure according to one embodiment.

FIG. 6 is a schematic diagram of an encoding procedure according to one embodiment. As shown in FIG. 6, the following content is mainly included.

601. Input an image, divide the image into image blocks, and perform downsampling on a luma component of a current to-be-processed image block, to obtain an initial signal.

602. Subtract a prediction signal from the initial signal, to obtain a residual signal of the luma component of the current to-be-processed image block.

It should be noted that the prediction signal is a prediction signal obtained when a reconstructed pixel of the luma component of the current to-be-processed image block is generated based on an adjacent reconstructed pixel of the current to-be-processed image block and used as a reference pixel. The following steps are included: 603. Perform dequantization on a quantization coefficient of the luma component of the current to-be-processed image block generated based on the adjacent reconstructed pixel of the current to-be-processed image block, to obtain a transform coefficient; and perform inverse transform on the transform coefficient, to obtain the residual signal of the luma component of the current to-be-processed image block. 604. Perform filtering after the prediction signal and the residual signal are added. 605. Obtain the reconstructed pixel of the luma component of the current to-be-processed image block.

606. Perform a spatial transform operation on the residual signal of the luma component of the current to-be-processed image block, to obtain the transform coefficient, and then perform a quantization operation on the transform coefficient, to obtain the quantization coefficient.

607. Perform entropy encoding on the quantization coefficient by using an entropy encoding technology such as variable-length encoding or binary encoding, to obtain a compressed bitstream.

It should be understood that during the encoding, downsampling is not performed on the luma component of the to-be-processed image block in the foregoing procedure. Original-resolution encoding is performed to obtain original-resolution encoding costs. The original-resolution encoding costs of the current to-be-processed image block are compared with downsampling encoding costs, and a compressed bitstream corresponding to an encoding manner at small encoding costs is selected.

When a chroma component of the to-be-processed image block is encoded, the chroma component of the to-be-processed image block may be predicted by using the reconstructed pixel of the luma component of the to-be-processed image block. It should be noted that during the prediction, resolution of the chroma component of the to-be-processed image block needs to be ensured to be the same as resolution of the luma component of the to-be-processed image block. If the resolution of the chroma component of the to-be-processed image block is different from the resolution of the luma component of the to-be-processed image block, the resolution of the luma component should be adjusted based on the resolution of the chroma component, so that resolution of the adjusted luma component of the to-be-processed image block is the same as the resolution of the chroma component of the to-be-processed image block. Further, the chroma component of the to-be-processed image block can be predicted based on the reconstructed pixel of the luma component of the to-be-processed image block.

Figure 7:
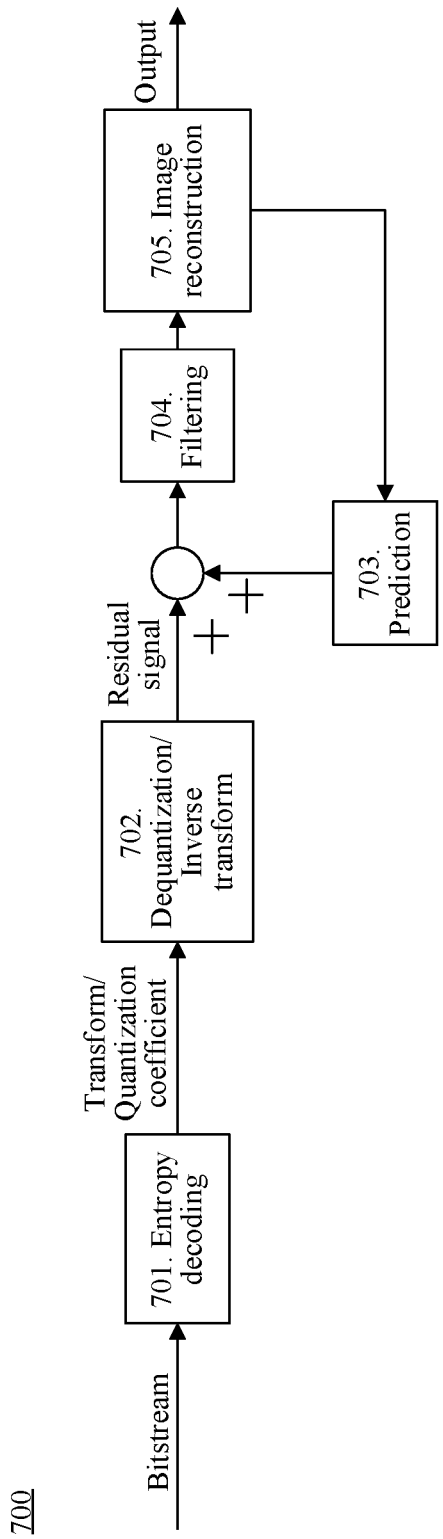
FIG. 7 is a schematic diagram of a decoding procedure according to one embodiment.

FIG. 7 is a schematic diagram of a procedure on a decoder side according to one embodiment. As shown in FIG. 7, the following content is mainly included.

701. Obtain, from a current bitstream through entropy decoding, whether a downsampling encoding mode is used for a luma component of a current to-be-processed image block (it is assumed herein that the downsampling mode is used for the current to-be-processed image block) and a transform/quantization coefficient.

702. Perform dequantization on the quantization coefficient of the luma component of the current to-be-processed image block, to obtain a transform coefficient; and perform inverse transform on the transform coefficient, to obtain a residual signal of the luma component of the current to-be-processed image block.

703. Generate a prediction pixel of the luma component of the current to-be-processed image block based on an adjacent reconstructed pixel of the luma component of the current to-be-processed image block.

704. Perform filtering after the prediction signal and the residual signal are added.

705. Obtain a reconstructed pixel of the luma component of the current to-be-processed image block. It should be noted that resolution of the reconstructed pixel of the luma component is low. Upsampling needs to be further performed on the current low-resolution reconstructed pixel of the luma component, to obtain a reconstructed pixel of the original-resolution luma component of the current to-be-processed image block. An upsampling process and a downsampling process are reverse.

When it is obtained, from the bitstream through parsing, that downsampling is not performed on a chroma component of the current to-be-processed image block, that is, when resolution of the chroma component of the current to-be-processed image block is original resolution, a residual signal of the chroma component of the current to-be-processed image block is obtained through a same process. Then, a luma/chroma correlation model is applied to the low-resolution reconstructed pixel of the luma component, to obtain a prediction signal of the original-resolution chroma component of the to-be-processed image block; and filtering is performed based on a signal obtained after the prediction signal of the original-resolution chroma component of the current to-be-processed image block and the residual signal are added, to obtain a reconstruction signal of the original-resolution chroma component of the current to-be-processed image block.

Figure 8:
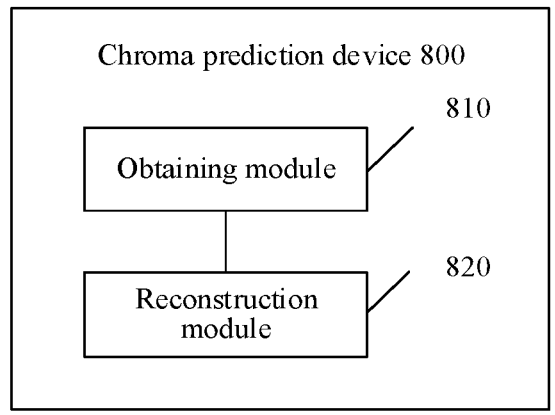
FIG. 8 is a schematic block diagram of a chroma prediction device according to one embodiment.

FIG. 8 is a schematic block diagram of a chroma prediction device 800 according to one embodiment. As shown in FIG. 8, the chroma prediction device 800 includes:

an obtaining module 810 configured to obtain luma information and chroma information of a to-be-processed image block, first processing information, and second processing information, where the first processing information is used to indicate a downsampling processing manner used for a luma component of the to-be-processed image block, and the second processing information is used to indicate a downsampling processing manner used for a chroma component of the to-be-processed image block; and a reconstruction module 820 configured to reconstruct a transient luma block of the to-be-processed image block based on the luma information of the to-be-processed image block, where resolution of the transient luma block is determined by using a sampling format of the to-be-processed image block and the first processing information.

The obtaining module 810 is further configured to obtain a prediction block of a transient chroma block of the to-be-processed image block based on the resolution of the transient luma block, the sampling format of the to-be-processed image block, and the second processing information, where the resolution of the transient luma block is the same as resolution of the transient chroma block, and the resolution of the transient chroma block is determined by using the sampling format of the to-be-processed image block and the second processing information.

In one embodiment, the obtaining module 810 and the reconstruction module 820 are configured to perform operations in the chroma prediction method 200 in this application. For brevity, details are not described herein again.

In one embodiment, the chroma prediction device 800 is configured to decode the to-be-processed image block. The obtaining module 810 is configured to: obtain the luma information and the chroma information from a bitstream, and obtain the first processing information and the second processing information from the bitstream, or obtain the first processing information from the bitstream and obtain the preset second processing information, or obtain the second processing information from the bitstream and obtain the preset first processing information, or obtain the preset first processing information and the preset second processing information.

In one embodiment, the chroma prediction device 800 is configured to encode the to-be-processed image block. The obtaining module 810 is configured to:

separately calculate encoding costs of the to-be-processed image block that are determined by using at least one piece of candidate first processing information and at least one piece of candidate second processing information;

determine candidate first processing information and candidate second processing information that are corresponding to minimum encoding costs as the obtained first processing information and the obtained second processing information; and encode the to-be-processed image block based on the obtained first processing information and the obtained second processing information, to obtain the luma information and the chroma information of the to-be-processed image block.

The chroma prediction device 800 is corresponding to the chroma prediction device in the method embodiment, and a corresponding module performs a corresponding step. For details, refer to the corresponding method embodiment.

Figure 9:
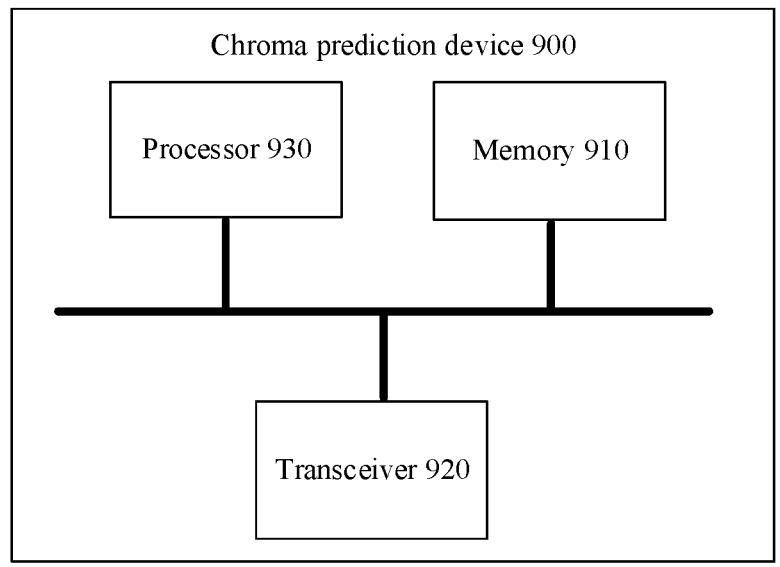
FIG. 9 is a schematic block diagram of a chroma prediction device according to one embodiment.

FIG. 9 is a schematic block diagram of a chroma prediction device 900 according to one embodiment. As shown in FIG. 9, the chroma prediction device 900 includes:

a memory 910 configured to store a program, where the program includes code;

a transceiver 920 configured to communicate with another device; and a processor 930 configured to execute the program code in the memory 910.

In one embodiment, when the code is executed, the processor 930 may implement operations of the method 200. For brevity, details are not described herein again. The transceiver 920 is configured to transmit and receive a signal after being driven by the processor 930.

The chroma prediction device 900 is corresponding to the chroma prediction device in the method embodiment, and a corresponding module performs a corresponding step. For details, refer to the corresponding method embodiment.

Figure 10:
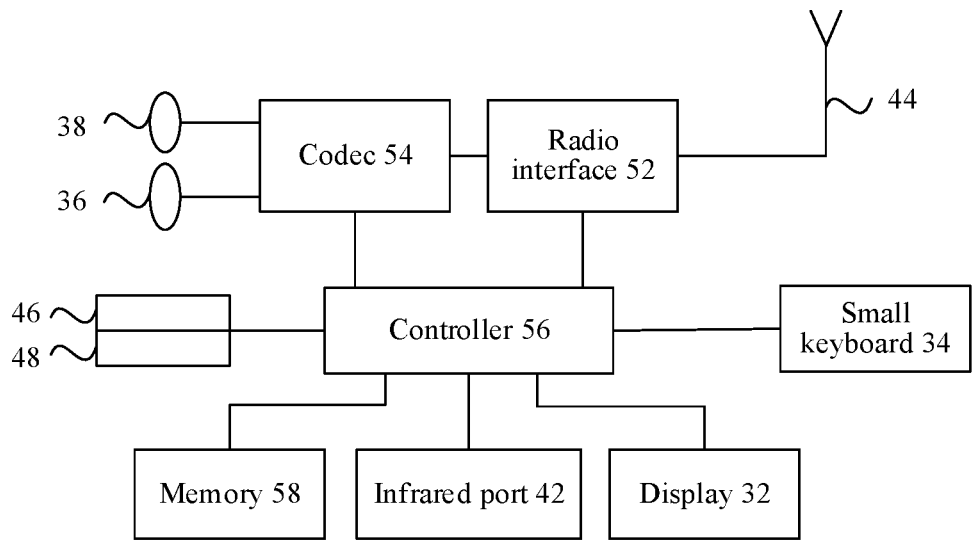
FIG. 10 is a schematic block diagram of a video encoding/decoding apparatus or an electronic device according to one embodiment.
Figure 11:
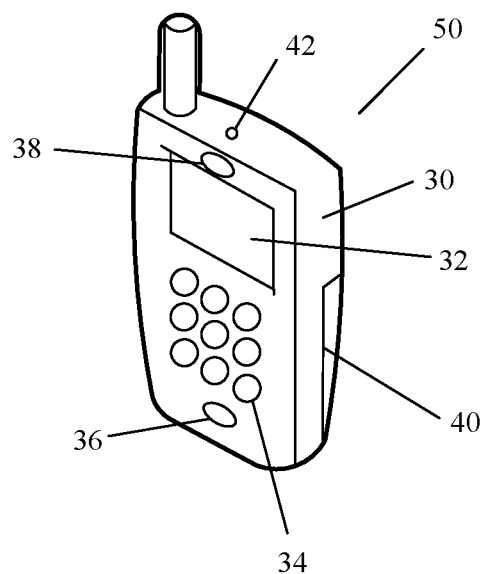
FIG. 11 is a schematic diagram of an apparatus for video encoding according to one embodiment.

FIG. 10 is a schematic block diagram of a video encoding/decoding apparatus or an electronic device 1000. The apparatus or the electronic device may be integrated into a codec in the embodiments of the present application. FIG. 11 is a schematic diagram of an apparatus for video encoding according to one embodiment. The following describes units in FIG. 10 and FIG. 11.

The electronic device 1000 may be, for example, a mobile terminal or user equipment in a wireless communications system. It should be understood that the embodiments of this application may be implemented on any electronic device or any apparatus that may need to encode and decode, or encode, or decode a video image.

The apparatus 1000 may include a housing 30 configured to accommodate and protect a device. The apparatus 1000 may further include a display 32 in a form of a liquid crystal display. In another embodiment of this application, the display 32 may be any proper display used for displaying an image or a video. The apparatus 1000 may further include a small keyboard 34. In another embodiment of this application, any proper data or user interface mechanism may be used. For example, a user interface may be implemented as a virtual keyboard, or a data entry system may be implemented as a part of a touch-sensitive display. The apparatus may include a microphone 36 or any proper audio input, and the audio input may be digital or analog signal input. The apparatus 1000 may further include the following audio output device. The audio output device in this embodiment of this application may be any one of a headset 38, a loudspeaker, an analog audio output connection, or a digital audio output connection. The apparatus 1000 may further include a battery 40. In another embodiment of this application, the device may be powered by any proper mobile energy device such as a solar cell, a fuel cell, or a clock mechanism generator. The apparatus may further include an infrared port 42 used for short-range line of sight communication with another device. In another embodiment, the apparatus 1000 may further include any proper short-range communication solution such as a Bluetooth wireless connection or a USB/FireWire wired connection.

The apparatus 1000 may include a controller 56 that is configured to control the apparatus 1000 or a processor. The controller 56 may be connected to a memory 58. In this embodiment of this application, the memory 58 may store image data and audio data, and/or may store an instruction implemented on the controller 56. The controller 56 may be further connected to a codec circuit 54 that is configured to implement audio and/or video data encoding and decoding, or implement auxiliary encoding and decoding implemented by the controller 56.

The apparatus 1000 may further include a smart card 46 and a card reader 48, such as a UICC and a UICC reader, that are configured to provide user information and provide user authentication information used for network authentication and authorization.

The apparatus 1000 may further include a radio interface circuit 52. The radio interface circuit 52 is connected to the controller 56 and is configured to generate a wireless communication signal used for communication with a cellular communications network, a wireless communications system, or a wireless local area network. The apparatus 1000 may further include an antenna 44. The antenna 44 is connected to the radio interface circuit 52, configured to send, to other (or a plurality of) apparatuses, a radio frequency signal generated by the radio interface circuit 52, and configured to receive a radio frequency signal from the other (or the plurality of) apparatuses.

In some embodiments of this application, the apparatus 1000 includes a camera that can record or detect single frames, and the codec 54 or the controller 56 receives and processes the single frames. In some embodiments of this application, the apparatus may receive to-be-processed video image data from another device before transmission and/or storage. In some embodiments of this application, the apparatus 1000 may receive an image through a wireless or wired connection for encoding/decoding.

Persons of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of a technical solution. Persons skilled in the art may use different methods to implement the described functions for each particular application, but it should not be considered that the implementation goes beyond the scope of this application.

It may be clearly understood by the persons skilled in the art that, for convenience and brevity of description, for specific working processes of the system, apparatus, and unit described in the foregoing, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a USB flash drive, a removable hard disk, a read-only memory (ROM), a random access memory (RAM), a magnetic disk, and an optical disc.

The foregoing descriptions are merely specific implementations of this application, but the protection scope of this application is not limited thereto. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A block prediction device, comprising:
a processor; and
a non-transitory memory coupled to the processor and having processor-executable instructions stored therein, which when executed by the processor, cause the processor to:
obtain first processing information indicating whether downsampling is performed on a luma component of a to-be-processed image block;
obtain second processing information indicating whether downsampling is performed on a chroma component of the to-be-processed image block, wherein the second processing information is different from the first processing information;
reconstruct the luma component based on the first processing information;
reconstruct the chroma component based on the second processing information;

when the first processing information indicates that downsampling is performed on the luma component of the to-be-processed image block, perform a first upsampling processing on the luma component based on the first processing information to obtain a reconstructed luma block of the to-be-processed image block, wherein the first upsampling processing is a reverse processing of the downsampling indicated by the first processing information and performed on the luma component of the to-be-processed image block; and when the second processing information indicates that downsampling is performed on the chroma component of the to-be-processed image block, perform a second upsampling processing on the chroma component based on the second processing information to obtain a reconstructed chroma block of the to-be-processed image block, wherein the second upsampling processing is a reverse processing of the downsampling indicated by the second processing information and performed on the chroma component of the to-be-processed image block.

2. The block prediction device according to claim 1, wherein the processor is further configured to:
encode at least one of: the first processing information or the second processing information to a bitstream.

3. The block prediction device according to claim 2, wherein the processor is configured to:
obtain at least one of: the first processing information or the second processing information by parsing the bitstream.

4. The block prediction device according to claim 2, wherein the processor is configured to:
obtain the first processing information from the bitstream and obtain preset second processing information as the second processing information; or
obtain the second processing information from the bitstream and obtain preset first processing information as the first processing information; or
obtain preset first processing information as the first processing information and preset second processing information as the second processing information.

5. The block prediction device according to claim 2, wherein the bitstream comprises the first processing information including first identifier information used to indicate whether the downsampling is performed on the luma component.

6. The block prediction device according to claim 5, wherein the first identifier information is 0 or 1, 0 indicating that the downsampling is not performed on the luma component and 1 indicating that the downsampling is performed on the luma component.

7. The block prediction device according to claim 1, wherein the first processing information further includes first index information used to indicate a filter that performs the downsampling on the luma component.

8. The block prediction device according to claim 1, wherein the second processing information includes second identifier information used to indicate whether the downsampling is performed on the chroma component.

9. The block prediction device according to claim 8, wherein the second identifier information is 0 or 1, 0 indicating that the downsampling is not performed on the chroma component and 1 indicating that the downsampling is performed on the chroma component.

10. The block prediction device according to claim 1, wherein a sampling format of the to-be-processed image block is 4:2:0.

11. A method of block prediction, comprising:
obtaining first processing information indicating whether downsampling is performed on a luma component of a to-be-processed image block;
obtaining second processing information indicating whether downsampling is performed on a chroma component of the to-be-processed image block, wherein the second processing information is different from the first processing information;
reconstructing the luma component based on the first processing information;
reconstructing the chroma component based on the second processing information;
when the first processing information indicates that downsampling is performed on the luma component of the to-be-processed image block, performing a first upsampling processing on the luma component based on the first processing information to obtain a reconstructed luma block of the to-be-processed image block, wherein the first upsampling processing is a reverse processing of the downsampling indicated by the first processing information and performed on the luma component of the to-be-processed image block; and
when the second processing information indicates that downsampling is performed on the chroma component of the to-be-processed image block, performing a second upsampling processing on the chroma component based on the second processing information to obtain a reconstructed chroma block of the to-be-processed image block, wherein the second upsampling processing is a reverse processing of the downsampling indicated by the second processing information and performed on the chroma component of the to-be-processed image block.

12. The method according to claim 11, wherein the first processing information further includes first index information used to indicate a filter that performs the downsampling on the luma component.

13. The method according to claim 11, wherein the second processing information including second identifier information, the second identifier information is 0 or 1, 0 indicating that the downsampling is not performed on the chroma component and 1 indicating that the downsampling is performed on the chroma component.

14. The method according to claim 11, wherein a sampling format of the to-be-processed image block is 4:2:0.

15. The method according to claim 11, further comprising:
encoding at least one of: the first processing information or the second processing information to a bitstream.

16. The method according to claim 15, wherein the bitstream comprises the first processing information including first identifier information used to indicate whether the downsampling is performed on the luma component.

17. The method according to claim 15, wherein obtaining the first processing information and the second processing information of the to-be-processed image block comprises:

obtaining the first processing information from the bitstream and obtaining preset second processing information; or
obtaining the second processing information from the bitstream and obtaining preset first processing information; or
obtaining the preset first processing information and the preset second processing information.

18. The method according to claim 15, comprising:
obtaining at least one of: the first processing information or the second processing information by parsing the bitstream.

19. The method according to claim 16, wherein the first identifier information is 0 or 1, 0 indicating that the downsampling is not performed on the luma component and 1 indicating that the downsampling is performed on the luma component.

20. A non-transitory computer-readable storage medium storing instructions that when executed by one or more processors, cause the one or more processors to:
obtain first processing information indicating whether downsampling is performed on a luma component of a to-be-processed image block;
obtain second processing information indicating whether downsampling is performed on a chroma component of the to-be-processed image block, wherein the second processing information is different from the first processing information;
reconstruct the luma component based on the first processing information;
reconstruct the chroma component based on the second processing information;
when the first processing information indicates that downsampling is performed on the luma component of the to-be-processed image block, perform a first upsampling processing on the luma component based on the first processing information to obtain a reconstructed luma block of the to-be-processed image block, wherein the first upsampling processing is a reverse processing of the downsampling indicated by the first processing information and performed on the luma component of the to-be-processed image block; and
when the second processing information indicates that downsampling is performed on the chroma component of the to-be-processed image block, perform a second upsampling processing on the chroma component based on the second processing information to obtain a reconstructed chroma block of the to-be-processed image block, wherein the second upsampling processing is a reverse processing of the downsampling indicated by the second processing information and performed on the chroma component of the to-be-processed image block.

21. The non-transitory storage medium according to claim 20, wherein a sampling format of the to-be-processed image block is 4:2:0.

* * * * *